US008881106B2

(12) United States Patent
Lachner et al.

(10) Patent No.: US 8,881,106 B2
(45) Date of Patent: Nov. 4, 2014

(54) DEBUGGING PARALLEL SOFTWARE USING SPECULATIVELY EXECUTED CODE SEQUENCES IN A MULTIPLE CORE ENVIRONMENT (75) Inventors: Peter Lachner, Heroldstatt (DE); Konrad K. Lai, Vancover, WA (US); Ravi Rajwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 12/978,480

(22) Filed: Dec. 24, 2010

(65) Prior Publication Data

US 2011/0197182 A1    Aug. 11, 2011

Related U.S. Application Data (60) Provisional application No. 61/290,193, filed on Dec. 26, 2009.

(51) Int. Cl.
*G06F 9/44*    (2006.01)
*G06F 11/36*   (2006.01)
*G06F 9/38*    (2006.01)

(52) U.S. Cl.
CPC ............ *G06F 9/3842* (2013.01); *G06F 11/362* (2013.01); *G06F 9/3861* (2013.01)
USPC ........................................................ 717/124

(58) Field of Classification Search
None
See application file for complete search history.

(56) References Cited

U.S. PATENT DOCUMENTS

| 6,189,068 | B1 * | 2/2001 | Witt et al. ........................ 711/3 |
| 6,286,132 | B1 * | 9/2001 | Tanaka et al. ................. 717/125 |
| 7,051,238 | B2 * | 5/2006 | Gardner et al. ............ 714/38.13 |
| 7,181,599 | B2 * | 2/2007 | DeWitt et al. ................. 712/227 |
| 7,757,237 | B2 * | 7/2010 | Karp et al. ..................... 718/108 |
| 7,761,617 | B2 * | 7/2010 | Seigneret et al. ............... 710/22 |
| 7,849,446 | B2 * | 12/2010 | Lev et al. ...................... 717/124 |
| 8,201,152 | B2 * | 6/2012 | Li et al. ........................ 717/129 |
| 2004/0025080 | A1 * | 2/2004 | Gardner et al. ................. 714/25 |
| 2006/0026582 | A1 * | 2/2006 | Collard et al. ................ 717/161 |
| 2009/0204849 | A1 * | 8/2009 | Shimura ........................ 714/27 |
| 2009/0249302 | A1 * | 10/2009 | Xu et al. ....................... 717/128 |
| 2010/0042981 | A1 * | 2/2010 | Dreyer et al. ................. 717/146 |
| 2010/0274972 | A1 * | 10/2010 | Babayan et al. .............. 711/125 |
| 2010/0332808 | A1 * | 12/2010 | Adl-Tabatabai et al. ..... 712/225 |

OTHER PUBLICATIONS

"Coarse-grained thread pipelining: a speculative parallel execution model for shared-memory multiprocessors," Parallel and Distributed Systems, IEEE Transactions on , vol. 12, No. 9, pp. 952-966, Sep. 2001.*
"ReEnact: Using ThreadLevel Speculation Mechanisms to Debug Data Races in Multithreaded Codes", Milos Prvulovic and Josep Torrellas, Proceedings of the 30th Annual International Symposium on Computer Architecture (ISCA-30), Jun. 2003.*

* cited by examiner

*Primary Examiner* — Don Wong
*Assistant Examiner* — Daxin Wu
(74) *Attorney, Agent, or Firm* — Caven & Aghevli LLC (57) ABSTRACT Methods and apparatus relating to debugging parallel software using speculatively executed code sequences in a multiple core environment are described. In an embodiment, occurrence of a speculative code debug event is detected and a speculative code execution debug module is executed in response to occurrence of the event. Other embodiments are also disclosed and claimed.

21 Claims, 5 Drawing Sheets

DEBUGGING PARALLEL SOFTWARE USING SPECULATIVELY EXECUTED CODE SEQUENCES IN A MULTIPLE CORE ENVIRONMENT

RELATED APPLICATION

The present application relates to and claims priority from U.S. Provisional Patent Application No. 61/290,193, filed on Dec. 26, 2009, entitled "DEBUGGING PARALLEL SOFTWARE USING SPECULATIVELY EXECUTED CODE SEQUENCES IN A MULTIPLE CORE ENVIRONMENT" which is hereby incorporated herein by reference in its entirety and for all purposes.

FIELD

The present disclosure generally relates to the field of computing. More particularly, an embodiment of the invention generally relates to techniques for debugging parallel software using speculatively executed code sequences in a multiple core environment.

BACKGROUND

To improve performance, some processors include multiple cores. To utilize the benefits of the multiple cores, however, software needs to be written to utilize these additional resources. Moreover, enabling the development of parallel software which scales well with an increasing number of processing units is one of the key challenges for the success of multi-core based processor technologies. Accordingly, reliable debugging methods are an important factor for allowing software developers to deploy applications exploiting these hardware capabilities with an expected level of quality and under reasonable time and cost budgets.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware" also referred to as "HW"), computer-readable instructions organized into one or more programs ("software" also referred to as "SW"), or some combination of hardware and software. For the purposes of this disclosure reference to "logic" shall mean either hardware, software (including for example micro-code that controls the operations of a processor), or some combination thereof.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Some implementations may avoid physical allocation of a synchronization element (also know as a "lock") and execute a code path speculatively instead. Only in case of conflicts, all speculatively created results are discarded and execution falls back to the traditional lock based model. If no conflict occurs, the effect of the speculative execution is made visible to the system at once, and execution continues as usual. A side effect of this approach is, that there may be code paths which would only be executed in this speculative mode. This causes a problem for debugging, as the individual instructions and their effect(s) inside such a code path cannot be observed from the outside, for example, not by application (e.g., ring-3) software debuggers (such as like Visual Studio®). To this end, some embodiments enable debugging of such code paths.

More particularly, some of the embodiments discussed herein may provide techniques for debugging parallel software using speculatively executed code sequences in a multiple core environment. In an embodiment, occurrence of a speculative code debug event during speculative execution of an application is detected (e.g., by a logic within in a processor). In response to occurrence of the speculative code debug event, a speculative code execution debug module (e.g., by a portion of debugger) is executed, e.g., to transfer debug control to the speculative code execution debug module.

Figure 1:
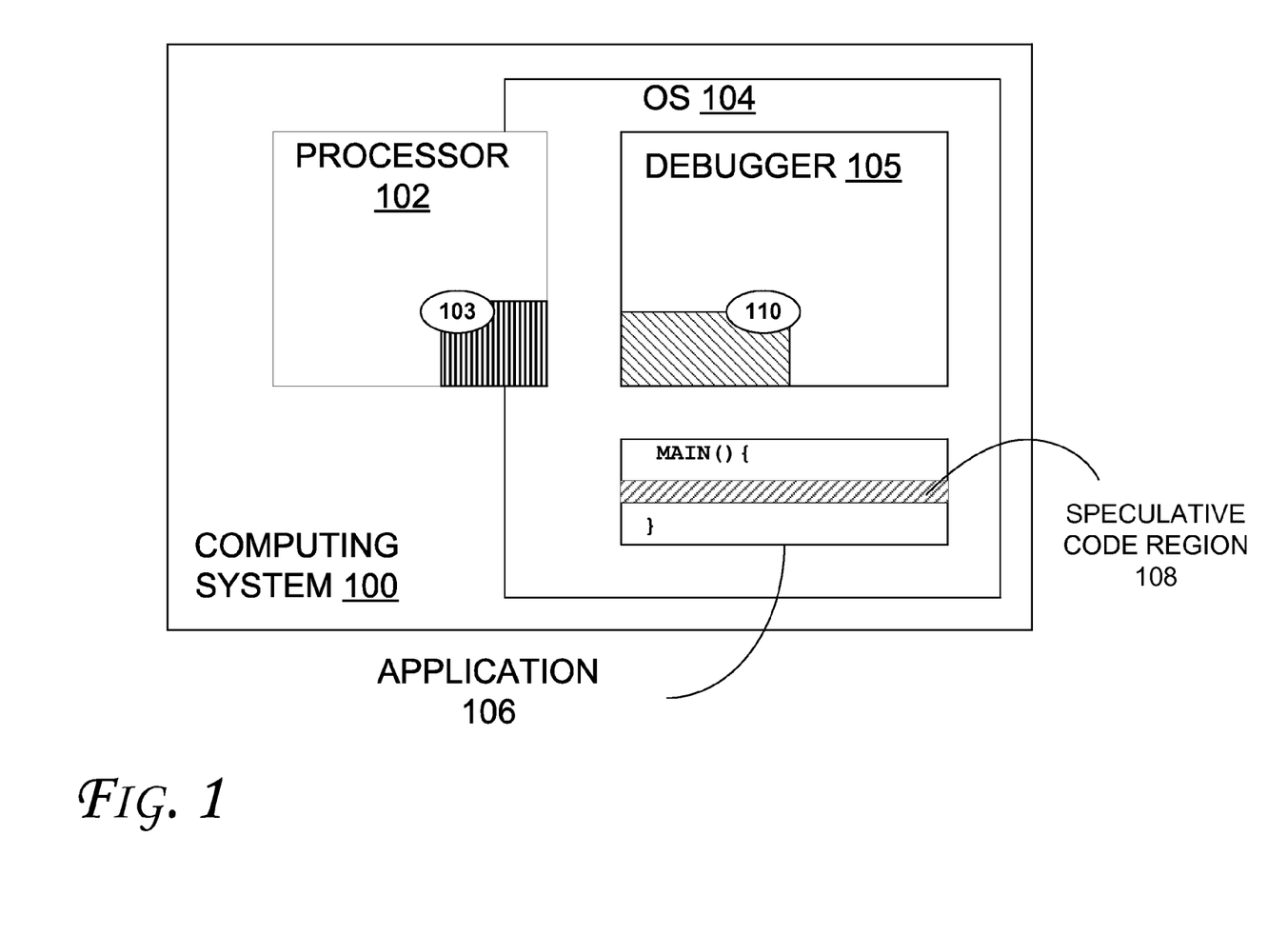
FIGS. 1 and 4-5 illustrate block diagrams of embodiments of computing systems, which may be utilized to implement some embodiments discussed herein.

FIG. 1 illustrates a block diagram of a computing system 100 in which some embodiments discussed herein may be implemented. As shown, system 100 may include a processor 102 which includes Speculative Code Execution (SCE) logic 103 to detect a speculative code debug event (such as discussed with reference to FIGS. 2-3), avoid physical allocation of a synchronization element (also know as a "lock"), and/or execute a code path speculatively instead. The processor 102 may be any type of a processor such as those discussed with reference to FIG. 4 or 5. Only in case of conflicts, the logic 103 may cause all speculatively created results to be discarded and execution to fall back to the lock-based model. If no conflict occurs, the effect of the speculative execution is made visible to the system at once by the logic 103, and execution continues as usual. As discussed herein, a "conflict" refers to an interference of the effects between the speculative execution, and anything happening elsewhere in the system, which could affect the final result. In an embodiment, logic 103 may have access to a storage device (such as caches/memories discussed with reference to FIG. 4 or 5) to store data corresponding to operations discussed herein with reference to debugging of parallel software.

An Operating System (OS) 104 and several applications (only one (106) is shown) are executed on the processor 102.

Any of the applications might have code, which use the logic 103. In case of debugging an application, a debugger 105 may control the execution of an application 106. As shown, application 106 may include a speculative code region 108. If debugging the speculatively executed code path is encountered (referred to herein as a speculative code debug event or more generally as a speculative debug event), the debugger 105 may use a Speculative Code Execution Debug Module (SCE-DM) 110.

In an embodiment, logic allows a debugger 105 to obtain control over the application 106, if there is a debug event encountered during speculative execution. In one embodiment, this debug specific functionality is to be enabled by a debugger explicitly. Furthermore, in case of entering a speculative code path under debug, the module 110 may be in charge of isolating this code execution from other threads/processes of the application 106. The module 110 may also abort or cause aborting of speculative execution to maintain correctness. This, for example, includes specifically the creation of an undo-log in some embodiments, which may allow the restoration to a point prior to occurrence of conflicts. In various embodiments, the undo-log may be collected by software (e.g., in the SCE-DM) and/or by hardware (e.g., logic within the processor 102). In some embodiments, Begin_SCE may be jumped over, since this code path is executed now non-speculatively. Furthermore, execution may be moved forward by the debugger until a monitored debug event like a BP is hit (again) via single step through code while manually building an undo-log.

Figure 2:
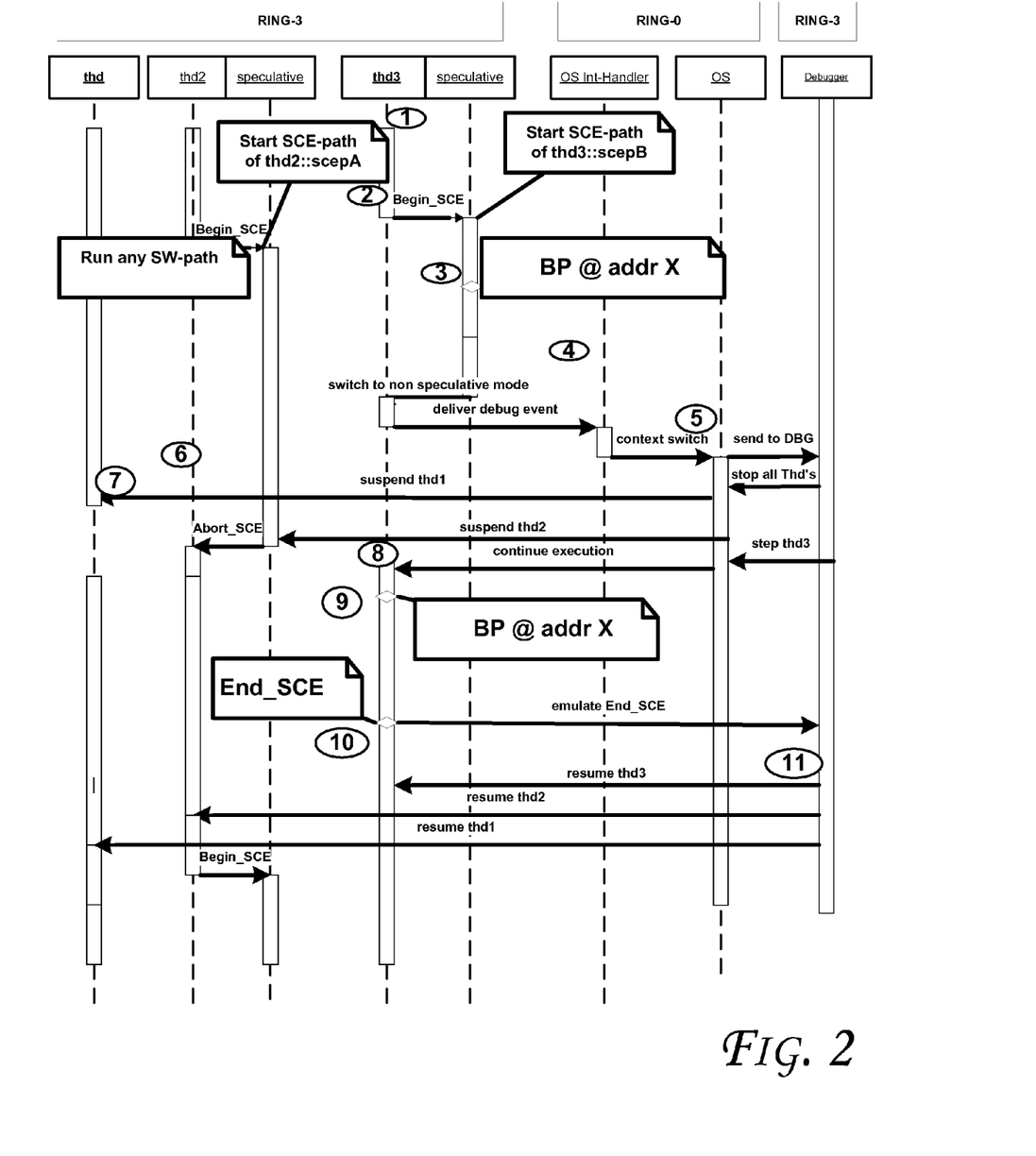
FIGS. 2-3 illustrate flow diagrams according to some embodiments of the invention.

FIG. 2 illustrates a flow diagram of the interaction between the SCE logic, SCE-DM, OS, debuggers, and application(s) for debugging, according to some embodiments.

As shown in FIG. 2, a user sets a breakpoint (BP) @ addr X inside thd3::scepA (speculative code execution path A) at item 1, where "thd" refers to "thread". At item 2, thd2 enters speculative execution while thd1 is executing any non-speculative code. At item 3, BP hits in speculative mode in thd3. At item 4, SCE hardware aborts speculative execution due to enable#DBinSCE=1, reset RIP to @Begin_SCE and delivers #DB.inSCE to debugger. At item 5, OS delivers a debug exception to the attached debugger. At item 6, Debugger stops all threads of the application and thd2 leaves speculative execution. At item 7, Thd3 is stopped. At item 8, Debugger resumes execution only for thd3.

At item 9, BP hit occurs in non-speculative mode and debug exception is sent to the debugger. At item 10, the flow reaches the end of SCE. At item 11, the debugger resumes thd 1 and thd2. As shown, the debugger resumes thd3 after End_SCE instruction and discards undo-log. No commit of speculative state is necessary, as the code was executed non-speculatively and therefore the effects of the instructions are already visible.

Figure 3:
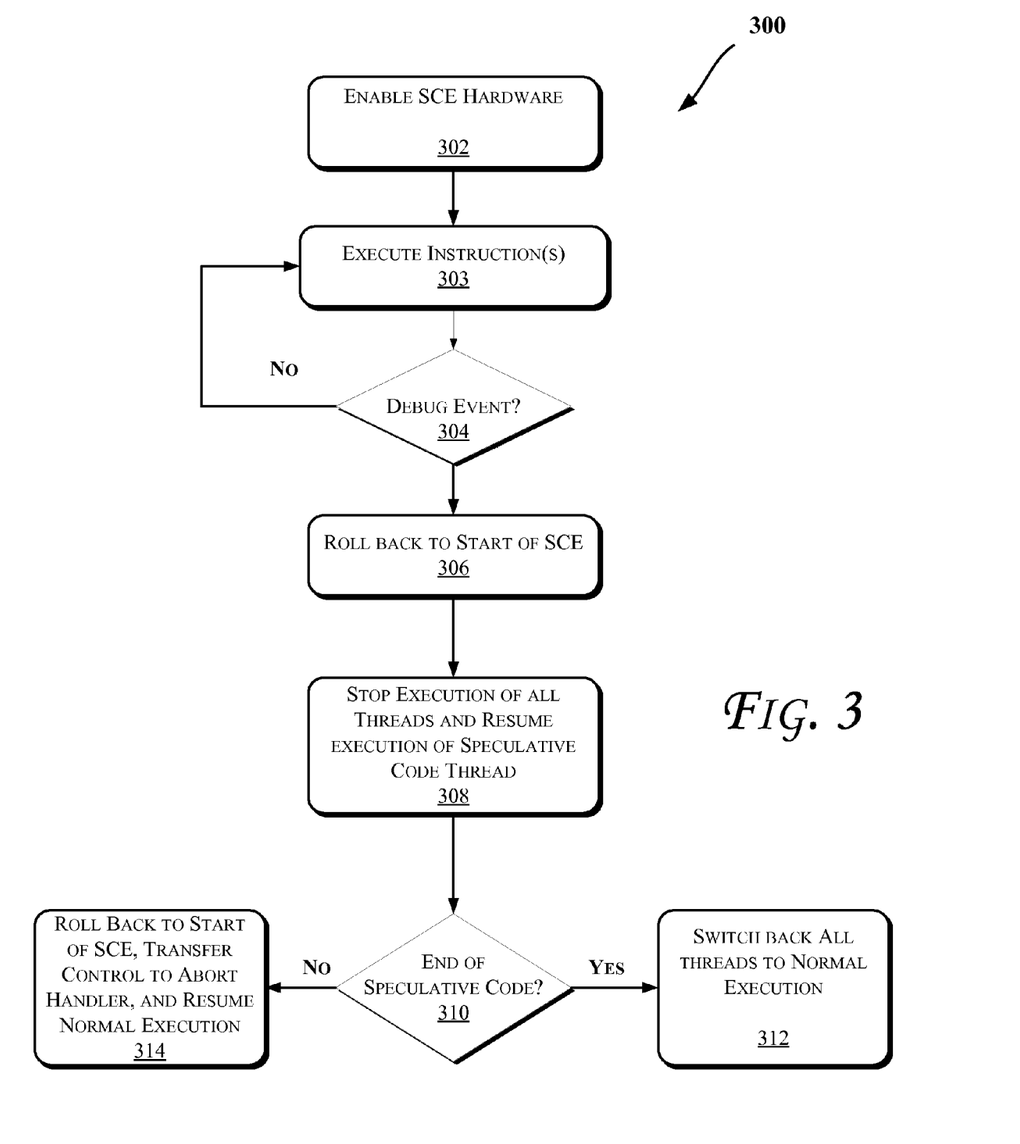

FIG. 3 illustrates a method 300 to debugging parallel software using speculatively executed code sequences in a multiple core environment, according to an embodiment. In some embodiments, one or more components discussed herein (e.g., with reference to FIG. 1-2 or 4-5) may be used to perform one or more of the operations of method 300.

Referring to FIGS. 1-3, at an operation 302, SCE hardware 103 is enabled (e.g., via an enable#DBinSCE bit stored in a register or a memory device such as those discussed with reference to FIG. 4 or 5, including a cache, etc.). At an operation 303, one or more instructions are executed. Upon occurrence of a speculative debug event 304 (e.g., indicating presence of a speculative code region, such as region 108), logic 103 may cause the roll back of the speculative execution path to start of SCE (Begin_SCE) point and may further cause issuance of a regular (non-speculative) debug event (e.g., via the OS) to the debugger (e.g., debugger 105), e.g., instead of aborting the speculative execution and resuming at the abort handler (illustrated as Internal Handler (Int-Handler) in FIG. 2).

At an operation 308, the debugger stops the execution of all threads/processes of the application being debugged and resumes the execution of only the particular thread corresponding to the operation 304. If the speculative code path reaches its end 310, the debugger switches back all threads to normal execution 312. If the speculative code path does not end normally 310, however, the debugger rolls back until Begin_SCE, transfers control to the abort handler, and resumes normal execution 314.

Accordingly, some embodiments allow for debugging of arbitrary speculative code sequences for functional correctness. In an embodiment, a strict pay-as-you-go model may be used, e.g., only actively debugging (hit a breakpoint, single stepping through it) a speculative code path has impact on the runtime behaviour of the application. Further, there may not be any special debug builds required, and application execution may be unaffected as long as no debug event such as breakpoints or similar events are intercepted by a debugger. Also, debug tools do not need to know which code paths are (potentially) executed speculatively. No debug specific compiler tools enabling may be needed. Moreover, at least some embodiments allow for debugging in a live code image environment. Furthermore, entering-into and exiting out of debugger interaction may be provided without the need to inject system state back and forth between real hardware and any emulation or simulation software. Moreover, code may be always executed on real hardware; hence, there is no need for code instrumentation, emulation, or simulation.

Additionally, switching back to normal execution may be allowed if debugging left speculative code path. Debugging may take place inside a live context. No offline trace or simulation based debugging may be required. At least some embodiments are backward compatible for existing legacy debuggers. Although those non-enabled debuggers would not see the speculative code portions at all (nor would receiving any debug events issued inside speculative execution), this may still allow debugging other code as usual. This may be important, since such code path might be buried inside a runtime library. Debugging of speculative code path is transparent to OS and OS debug APIs (Application Programming Interfaces). Further, no issues may be introduced through provision of some embodiments with OS scheduling of threads or thread migration. Also, hardware debug features (e.g., as data access breakpoints) may remain functional inside speculative regions.

Figure 4:
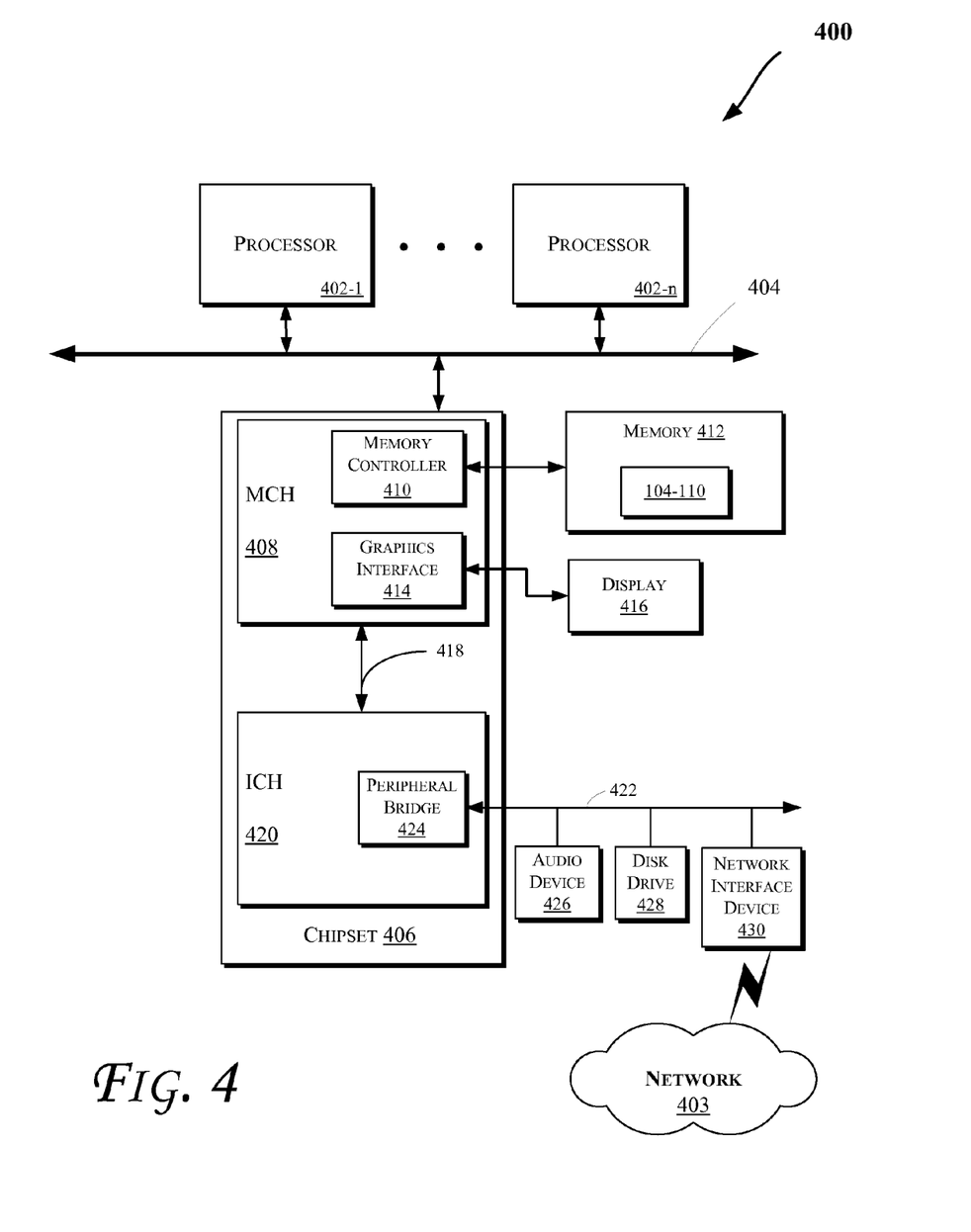

FIG. 4 illustrates a block diagram of an embodiment of a computing system 400. In various embodiments, one or more of the components of the system 400 may be provided in various electronic devices capable of performing one or more of the operations discussed herein with reference to some embodiments of the invention. For example, one or more of the components of the system 400 may be used to perform the operations discussed with reference to FIGS. 1-3, e.g., by debugging parallel software, etc. Also, various storage devices discussed herein (e.g., with reference to FIGS. 4 and/or 5) may be used to store data, operation results, etc. In one embodiment, data, including sequences of instructions that are executed by the processor 402, associated with operations of method 300 of FIG. 3 may be stored in memory device(s) (such as memory 412 or one or more caches (e.g., L1 caches in an embodiment) present in processors 402 of FIG. 4 or 502/504 of FIG. 5).

Moreover, the computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Additionally, the processors 402 may utilize an SIMD (Single-Instruction, Multiple-Data) architecture.

A chipset 406 may also communicate with the interconnection network 404. The chipset 406 may include a memory control hub (MCH) 408. The MCH 408 may include a memory controller 410 that communicates with a memory 412 (which may store one or more of the items 104-110 of FIG. 1). The memory 412 may store data, including sequences of instructions that are executed by the processor 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display 416. The display 416 may be used to show a user results of operations associated with the fast division/inversion discussed herein. In one embodiment of the invention, the graphics interface 414 may communicate with the display 416 via an accelerated graphics port (AGP). In an embodiment of the invention, the display 416 may be a flat panel display that communicates with the graphics interface 414 through, for example, a signal converter that translates a digital representation of an image stored in a storage device such as video memory or system memory into display signals that are interpreted and displayed by the display 416. The display signals produced by the interface 414 may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430, which may be in communication with the computer network 403. In an embodiment, the device 430 may be a NIC capable of wireless communication. Other devices may communicate via the bus 422. Also, various components (such as the network interface device 430) may communicate with the MCH 408 in some embodiments of the invention. In addition, the processor 402 and the MCH 408 may be combined to form a single chip. Furthermore, the graphics interface 414 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
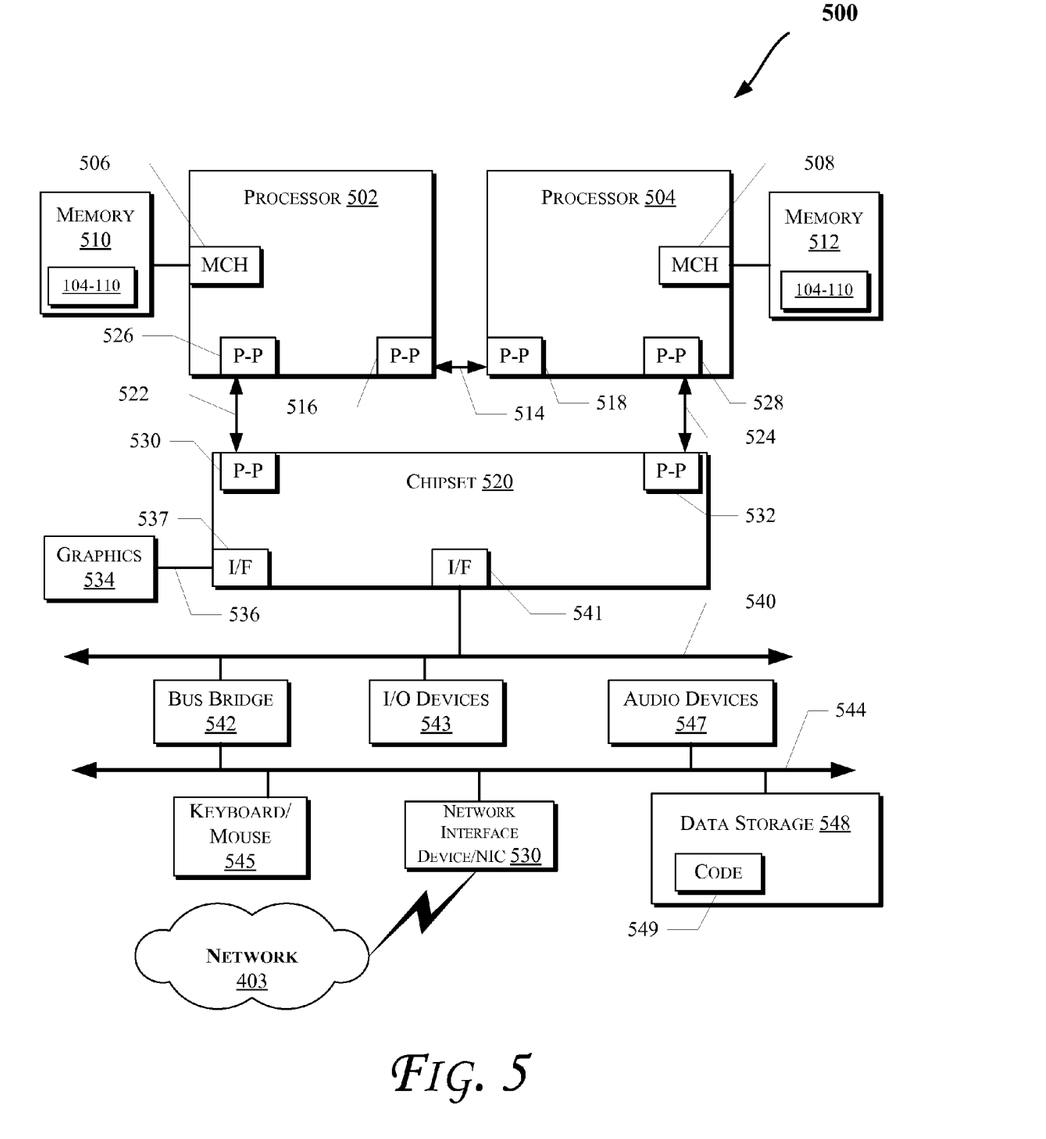

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 412 of FIG. 4 (such as one or more of the items 104-110 of FIG. 1).

The processors 502 and 504 may be any suitable processor such as those discussed with reference to the processors 402 of FIG. 4. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be provided by utilizing the processors 502 and 504. For example, the processors 502 and/or 504 may perform one or more of the operations of FIGS. 1-3. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 542 may be coupled to other devices such as a keyboard/mouse 545, the network interface device 530 discussed with reference to FIG. 5 (such as modems, network interface cards (NICs), or the like that may be coupled to the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software (including, for example, micro-code that controls the operations of a processor such as the processors discussed with reference to FIGS. 1-5), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals embodied in tangible propagation medium via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   speculative code execution logic to detect occurrence of a speculative code debug event during speculative execution of an application; and
   Non-transitory memory to store a speculative code execution debug module, wherein the speculative code execution logic is to cause execution of the speculative code execution debug module in response to the occurrence of the speculative code debug event, wherein the speculative code execution logic is to cause a roll back to a speculative execution path to a start of a speculative code execution point and to cause issuance of a non-speculative debug event to a non-speculative debugger instead of aborting the speculative execution path, wherein all threads, other than a thread corresponding to the speculative code debug event, are to be suspended in response to the occurrence of the speculative code debug event until an end of a Speculative Code Execution (SCE) for the thread is reached.

2. The apparatus of claim 1, wherein the speculative code execution logic is to transfer debug control to the speculative code execution debug module.

3. The apparatus of claim 2, wherein the speculative code execution debug module is to cause execution of a code region, corresponding to the speculative code debug event, in non-speculative mode.

4. The apparatus of claim 1, further comprising a storage device to store a bit indicative of whether the speculative code execution logic is enabled.

5. The apparatus of claim 1, wherein the memory is to store one or more of: an operating system, the debugger, or the application.

6. The apparatus of claim 1, wherein the speculative code execution debug logic is to generate an undo-log to withdraw effects of speculative code sequence under debug.

7. The apparatus of claim 1, further comprising a processor to comprise the speculative code execution logic, wherein the processor is to comprise one or more processor cores.

8. A method comprising:
   detecting an occurrence of a speculative code debug event during speculative execution of an application;
   storing a speculative code execution debug module in a memory;
   executing the speculative code execution debug module in response to the occurrence of the speculative code debug event;
   rolling back operations to a speculative execution path to a start of a speculative code execution point; and
   issuing a non-speculative debug event to a non-speculative debugger instead of aborting the speculative execution path, wherein all threads, other than a thread corresponding to the speculative code debug event, are suspended in response to the occurrence of the speculative code debug event until an end of a Speculative Code Execution (SCE) for the thread is reached.

9. The method of claim 8, further comprising transferring debug control to the speculative code execution debug module.

10. The method of claim 9, further comprising the speculative code execution debug module is to cause execution of a code region, corresponding to the speculative code debug event, in non-speculative mode.

11. The method of claim 8, further comprising stopping all threads, other than a thread corresponding to the speculative code debug event, in response to the occurrence of the speculative code debug event.

12. The method of claim 8, further comprising switching back all threads to normal execution in response to reaching an end of a speculative code path corresponding to the speculative code debug event.

13. The method of claim 8, further comprising transferring control to an abort handler in response to not reaching an end of a speculative code path corresponding to the speculative code debug event.

14. A non-transitory computer-readable medium comprising one or more instructions that when executed on a processor configure the processor to perform one or more operations to:
   detect an occurrence of a speculative code debug event during speculative execution of an application;
   store a speculative code execution debug module in a memory;
   execute the speculative code execution debug module in response to the occurrence of the speculative code debug event;
   roll back operations to a speculative execution path to a start of a speculative code execution point; and
   issue a non-speculative debug event to a non-speculative debugger instead of aborting the speculative execution path, wherein all threads, other than a thread corresponding to the speculative code debug event, are to be suspended in response to the occurrence of the speculative code debug event until an end of a Speculative Code Execution (SCE) for the thread is reached.

15. The non-transitory computer-readable medium of claim 14, further comprising one or more instructions that when executed on a processor configure the processor to transfer debug control to the speculative code execution debug module.

16. The non-transitory computer-readable medium of claim 14, further comprising one or more instructions that when executed on a processor configure the processor to cause execution of a code region, corresponding to the speculative code debug event, in non-speculative mode.

17. The non-transitory computer-readable medium of claim 14, further comprising one or more instructions that when executed on a processor configure the processor to stop all threads, other than a thread corresponding to the speculative code debug event, in response to the occurrence of the speculative code debug event.

18. The non-transitory computer-readable medium of claim 14, further comprising one or more instructions that when executed on a processor configure the processor to switch back all threads to normal execution in response to reaching an end of a speculative code path corresponding to the speculative code debug event.

19. The non-transitory computer-readable medium of claim 14, further comprising one or more instructions that when executed on a processor configure the processor to transfer control to an abort handler in response to not reaching an end of a speculative code path corresponding to the speculative code debug event.

20. The apparatus of claim 1, wherein the speculative code execution logic is to cause issuance of the non-speculative debug event to the non-speculative debugger instead of aborting the speculative execution path and resuming at an abort handler.

21. The apparatus of claim 1, wherein the non-speculative debugger is to continue execution of at least one thread, corresponding to the speculative code debug event, without aborting the speculative execution path.

* * * * *